UNITED STATES PATENT OFFICE.

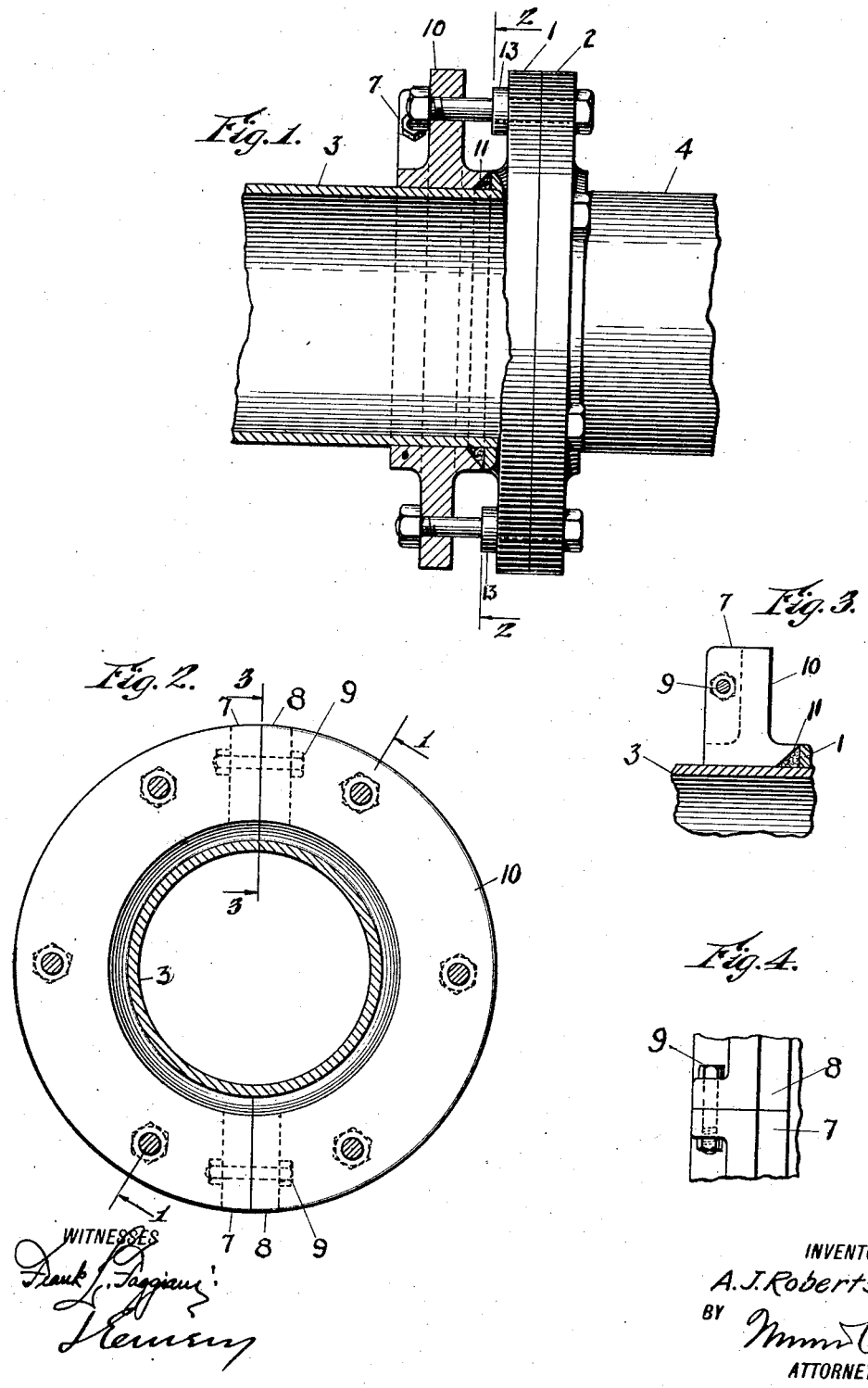

ALEXANDER JOHN ROBERTSON, OF WYCLIFFE, BRITISH COLUMBIA, CANADA.

SEALING OR STOPPING LEAKS IN PIPE-JOINTS.

1,322,347. Specification of Letters Patent. Patented Nov. 18, 1919.

Application filed February 20, 1919. Serial No. 278,120.

*To all whom it may concern:*

Be it known that I, ALEXANDER J. ROBERTSON, a subject of the King of Great Britain, residing at Wycliffe, British Columbia, Canada, have invented a new and useful device for Sealing or Stopping Leaks in Pipe-Joints, of which the following is a full, clear, and exact description, reference being had to the accompanying drawings, forming a part thereof, and wherein—

Figure 1 represents a sectional view of my device on the line 1—1 of Fig. 3;

Fig. 2 represents a face view of my device;

Fig. 3 represents a fragmental view of one of the joints of my device on the line 3—3 of Fig. 3; and Fig. 4 represents a fragmental view of a method of joining the sections of my device together.

My device particularly relates to means for stopping leaks in pipe joints and is particularly useful for joints where there is excessive vibration or poor provision for expansion.

Furthermore, the attachment of my device to the pipe flange materially strengthens the joint.

The drawings show my device attached to the ordinary form of pipe joint, which usually consists of two flanges 1 and 2 bolted together and the pipe sections 3 and 4.

In the drawings the leak is supposed to have occurred on the left side of the pipe joint.

My device comprises a split metal collar 5, 6 adapted to fit the pipe section. The sections of this metal collar are joined together by means of flanges 7 and 8 and by means of bolts 9, as particularly shown in Figs. 3 and 4, so that the collar can be easily slipped over the pipe.

The collar is preferably flat and is provided with a circumferential flange 10. This flange is designed to coincide with the outer contour of the pipe flanges and is provided with bolt holes corresponding or registering with the bolt holes in the pipe joint flanges. The inner edge of the abutting face of the split collar is beveled inward so that packing 11 may be inserted therein and forced against the leaking joint.

My device is held in contact with the pipe joint by means of bolts extending through the bolt holes in the pipe joint flanges 1 and 2 and the registering bolt holes in the circumferential flange 10 of the split collar.

It will be observed that these bolts are provided with a shoulder 13 which is adapted to act as a bolt head or stop as far as the pipe joint flanges are concerned. It will be perceived that this construction greatly strengthens the pipe joint itself while at the same time it will allow a slight play between the pipe joint flanges and my device owing to the packing ring 11 which will compensate any extra vibration of the parts.

What I claim and desire to secure by Letters Patent is:

1. An article of the class described including a pipe joint, a split collar provided with a packing cavity and with a circumferential flange provided with bolt holes and spaced from the said pipe joint, securing bolts provided with an intermediate shoulder and a bolt head or stop for the pipe coupling as a securing means for the split collar thereof.

2. An article of the class described including a pipe joint, a split collar provided with a packing cavity, the securing means thereof being spaced from the pipe joint and being held in rigid connection therewith through the securing means of the said pipe joint.

ALEXANDER JOHN ROBERTSON.